United States Patent [19]
Beurrier

[11] 3,919,660
[45] Nov. 11, 1975

[54] AMPLIFIERS WITH IMPEDANCE-MATCHED INPUTS AND OUTPUTS

[75] Inventor: Henry Richard Beurrier, Chester Township, Morris County, N.J.

[73] Assignee: Bell Telephone Laboratories, Incorporated, Murray Hill, N.J.

[22] Filed: Dec. 6, 1971

[21] Appl. No.: 204,865

[52] U.S. Cl................. 330/185; 330/53; 330/124 R
[51] Int. Cl.[2]........................................ H03F 1/00
[58] Field of Search............ 333/1, 11, 28, 8 C, 4 C; 330/185, 53, 149, 124 R, 30 R, 151

[56] References Cited

UNITED STATES PATENTS

| | | | |
|---|---|---|---|
| 3,202,928 | 8/1965 | Prior | 330/124 R |
| 3,403,357 | 9/1968 | Rosen et al. | 330/124 R X |
| 3,426,292 | 2/1969 | Seidel | 330/53 X |
| 3,605,031 | 9/1971 | Tongue | 333/11 X |

*Primary Examiner*—Nathan Kaufman
*Attorney, Agent, or Firm*—S. Sherman

[57] ABSTRACT

A variety of amplifiers are described, each of which comprises two active stages having equal coefficients of transmission, and mutually inverse input and output terminal impedances whose respective magnitudes are at least an order of magnitude different than that of the external circuits connected thereto. Input and output transformer networks couple the two stages to a common signal source and to a common output load.

7 Claims, 10 Drawing Figures

AMPLIFIERS WITH IMPEDANCE-MATCHED INPUTS AND OUTPUTS

This invention relates to low distortion, impedance-matched amplifiers.

BACKGROUND OF THE INVENTION

It is a very common practice to employ amplifiers whose input and output impedances are significantly different than the impedances of the circuits to which they are connected. In a communication system, however, large mismatches tend to produce echoes, delay distortion and other deleterious effects which adversely affect its operation and, hence, must be avoided.

The simplest way to match unequal impedances is by means of an impedance-matching transformer. Such an arrangement, however, can only be used when the two impedances to be matched are uniquely known. The input and output impedances of an amplifier, on the other hand, tend to vary as a function of frequency, and can also vary as a function of signal level. Hence, a simple transformer cannot generally be used for this purpose and, in particular, it cannot be readily used in association with a wideband amplifier.

In my copending applications Ser. Nos. 113,200 and 113,213, filed Feb. 8, 1971, and Ser. No. 126,683, filed Mar. 22, 1971, there are described various amplifier coupling circuits for coupling a pair of active stages, having mutually inverse terminal impedances, to a common signal source and to a common load impedance. It is an advantage of such circuits that the source and the load see only a matching impedance, notwithstanding the fact that the impedances of the active stages are, in reality, mismatches.

SUMMARY OF THE INVENTION

Amplifiers, in accordance with the present invention, are of the class comprising two active stages having equal coefficients of transmission, and mutually inverse input and output terminal impedances whose respective magnitudes are at least an order of magnitude different than that of the external circuits to which the stages are connected. Means are provided for coupling the input ends of the two stages to a common signal source, and for coupling the output ends of the two stages to a common output load.

In a first embodiment of the invention, the input and output coupling circuits comprise autotransformers. Each of the active stages is connected between a different end of the input transformer and a different end of the output transformer. The signal source and the output load are coupled, respectively to taps along the autotransformers. Matching impedances are connected across the autotransformers.

In a second embodiment of the invention, derived from the first embodiment, each of the input and output autotransformers is replaced by a two-winding transformer. The signal source and the output load are connected to the primary winding of each transformer. The active stages are connected between opposite ends of the transformers' secondary windings. Input and output matching impedances are connected to taps along the secondary windings of the respective transformers.

A third embodiment of the invention uses input and output autotransformers wherein the signal source and the output load are connected to one end of their respective transformers, and the matching impedances are connected to taps along the transformers. One active stage is connected at an end of each transformer, and the other at a tap along each transformer.

As will also be explained in greater detail hereinbelow, various modifications and combination of the above-described coupling circuits can be made.

It is an advantage of the present invention that they greatly extend the choice of matched amplifier circuits while preserving all of the preferred characteristics of this class of amplifier.

These and other objects and advantages, the nature of the present invention, and its various features will appear more fully upon consideration of the various illustrative embodiments now to be described in detail in connection with the accompanying drawings.

DETAILED DESCRIPTION

Figure 1A:
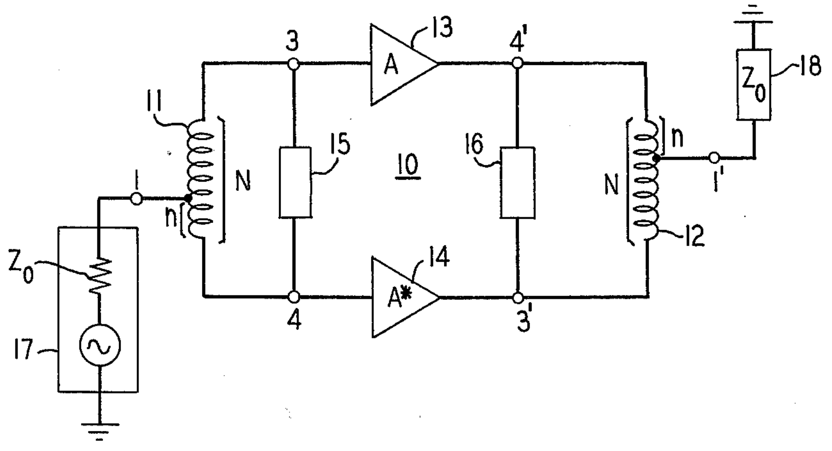
FIGS. 1A, 1B, and 1C, show a first embodiment of a matched amplifier, in accordance with the present invention, and modifications thereof.

Referring to the drawings, FIG. 1A shows a first embodiment of an amplifier 10, in accordance with the invention, comprising: an input autotransformer 11; an output autotransformer 12; active stages 13 and 14; and matching impedances 15 and 16. A signal source 17, having an output impedance $Z_o$, and an output load 18, of impedance $Z_o$, are connected, respectively, to input transformer 11 and output transformer 12. For convenience, the tap and the ends of input transformer 11 are identified in the circuit as ports 1, 3 and 4, and the corresponding terminals of output transformer 12 are correspondingly designated ports 1', 3' and 4'. As such, transformer port 1, to which signal source 17 is connected, corresponds to the amplifier input terminal, and port 1', to which load 18 is connected, corresponds to the amplifier output terminal.

One of the active stages 13 is connected between transformer ports 3 and 4', while the other stage is connected between transformer ports 4 and 3'. Matching impedance 15 is connected across transformer 11, between ports 3 and 4, while matching impedance 16 is connected across transformer 12, between ports 3' and 4'.

In operation, an input signal, applied at amplifier input terminal 1, is divided into two components by means of input transformer 11. The two signal components are amplified by the active stages, and then combined constructively in output load 18 by meand of output transformer 12. None of the signal energy is dissipated in the matching impedance 16.

Designating the total number of turns on transformers 11 and 12 as N, and the tap as being on the $n^{th}$ turn from the active stage having the lower input and output impedance, the gain G of this amplifier is given by $$G_{db} = 20 \log T, \quad (1)$$

where $T = N/n$.

The magnitudes of the matching impedances 15 and 16 connected across the $N$ turns of the respective transformers are qual to $Z_oT^2$. It should be noted, however, that, in general, the turns ratio $T$ for the two transformers, and the source and load impedances need not be equal.

Figure 1B:
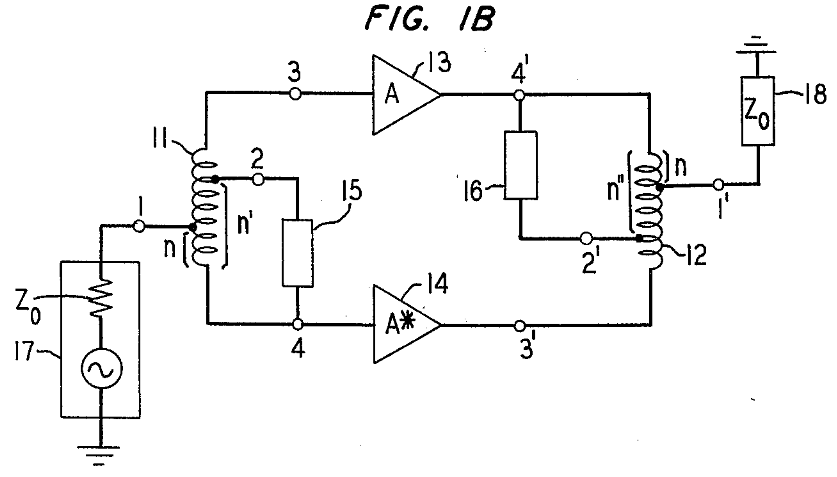

In the embodiment of FIG. 1, matching impedances 15 and 16 are connected, respectively across the entire input and the entire output autotransformers. More generally, however, these impedances can be connected across only a portion of the transformers, as illustrated in FIG. 1B. Using the same identification numerals as in FIG. 1A, to identify corresponding circuit components, FIG. 1B shows matching impedance 15 connected across the $n'$ turns of transformer 11 between a port 2 and port 3, and impedance 16 is shown connected across the $n''$ turns of transformer 12 between a port 2' and port 3'. In this latter case, the magnitudes of the impedances are given by $Z_o(n'/n)^2$ and $Z_o(n''/n)^2$, respectively. In all other respects, the two circuits are identical.

Figure 1C:
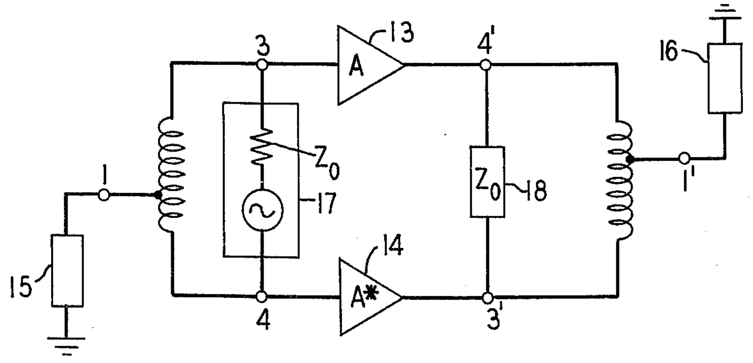

In the embodiments of FIGS. 1A and 1B, the source is connected to a tap along transformer 11, and the matching impedance is connected across the transformer. However, this arrangement can be reversed, as illustrated in FIG. 1C, which shows the matching impedance 15 connected to the tap, and the source 17 connected across the input transformer. Because of the symmetry of the circuit, this change has the effect of coupling the output signal to the shunting impedance connected across output transformer 12. Thus, the useful load 18 must now be connected across the output transformer, and the matching impedance 16 connected to the tap. As in the embodiment of FIGS. 1A and 1B, the relative impedances of the source and the load, and their associated matching impedances are defined by the transformer turns ratios.

Figure 2:
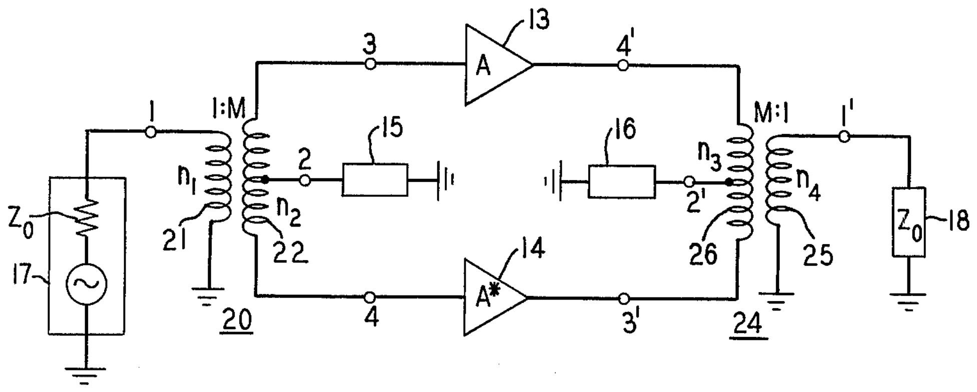
FIGS. 2 and 3 show a second and third embodiment of such matched amplifiers.

A further modification of this circuit can be made by replacing the input autotransformer and/or the output autotransformer with a two-winding transformer, as illustrated in FIG. 2. In this second embodiment of the invention, signal source 17 is coupled to the two active stages 13 and 14 through a 1:$M$ turns ratio input transformer 20. In particular, signal source 17 is connected across one of the input transformer windings 21. The input ends of active stages 13 and 14 are connected to opposite ends of the other transformer winding 22. A matching impedance 15, of magnitude $Z_ot^2$, is connected to a tap along winding 22, where $t$ is the ratio of the number of turns $n_2$ on winding 22 between the tap and the lower input impedance active stage to the number of turns $n_1$ on winding 21.

Similarly, at the output end of the amplifier, the useful output load 18 is coupled to the active stages by means of a second 1:$M$ turns ratio transformer 24. Specifically, load 18 is connected across one of the transformer windings 25. The output ends of active stages 13 and 14 are connected to opposite ends of the other transformer winding 26. Matching impedance 16, of magnitude $Z_ot_1^2$, is connected to a tap along winding 26 where, as above, $t_1$ is the ratio of the number of turns $n_3$ on winding 26 between the tap and the lower output impedance active stage to the number of turns $n_4$ on winding 25.

The operation of this amplifier is the same as described above.

Figure 3:
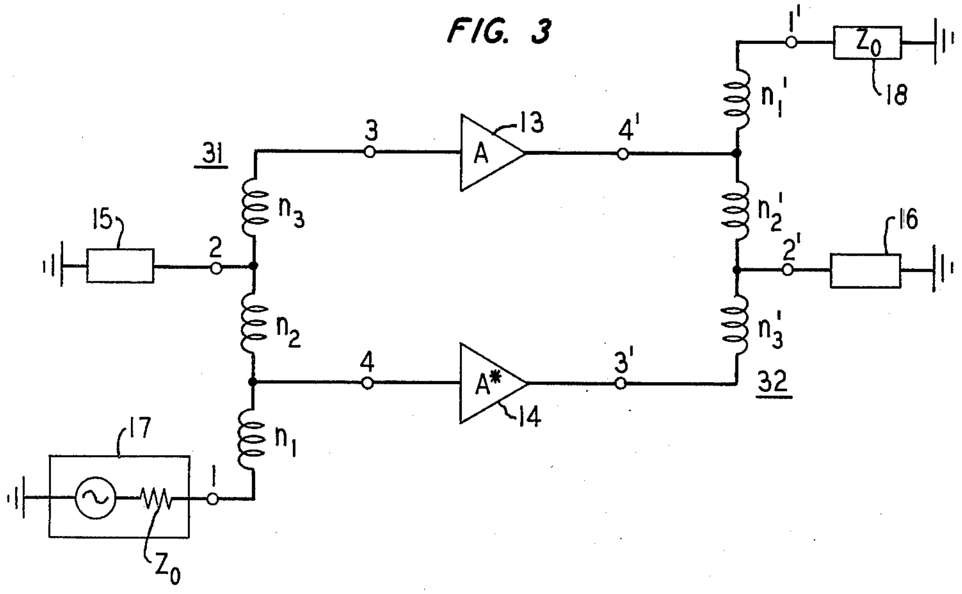

In the third embodiment of the invention, illustrated in FIG. 3, the source 17 is coupled to the active stages by means of an input autotransformer 31. However, in this embodiment, source 17 is coupled to one end of transformer 31, and the higher input impedance stage, assumed to be stage 13, is connected to the other end of this transformer. Stage 14 and the matching impedance 15 are connected to taps along the transformer. Advantageously, the lower impedance active stage is connected at a point between source 17 and impedance 15.

Similarly, at the output end of the amplifier, the useful load 18 is coupled at one end of output autotransformer 32, and the higher output impedance stage, assumed to be stage 14, is connected to the other end of the transformer. Stage 13 and matching impedance 16 are connected to taps along transformer 32.

Designating the number of turns between the respective connections as $n_1$, $n_2$ and $n_3$, and $n_1'$, $n_2'$ and $n_3'$ proper operation is obtained when $$\frac{n_2}{n_1} = \frac{n_3}{n_2} \text{ and } \frac{n_2'}{n_1'} = \frac{n_3'}{n_2'} \qquad (2)$$

The magnitudes of the matching impedances 15 and 16 are given by $$Z_o \left(\frac{n_2}{n_1}\right)^2$$

and $$Z_o \left(\frac{n_2'}{n_1'}\right)^2,$$

and the amplifier gain is given by $$G_{db} = 20 \log_{10} \left(\frac{n_2+n_1}{n_1}\right) + 20 \log_{10} \left(\frac{n_2'+n_1'}{n_1'}\right). \qquad (3)$$

Figure 4A:
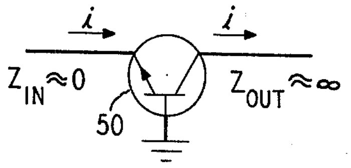
FIGS. 4A, 4B, 5, 6A and 6B show various arrangements of transistors to produce active stages which can be used to practice the invention.
Figure 4B:
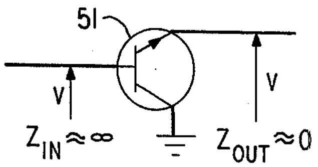

As indicated above, active stages 13 and 14 have mutually inverse terminal impedances which can be substantially realized by certain configurations of active elements. For example, a transistor 50 connected in the common base configuration, as illustrated in FIG. 4A, transforms a current $i$, with unity gain, from a low impedance to a high impedance. (That is, to within a good approximation, the input impedance $Z_{in}$ of a common base transistor is zero, and its output impedance $Z_{out}$ is infinite.) Conversely, a transistor 51, connected in a common collector configuration, as illustrated in FIG. 4B, transforms a voltage $v$, with unity gain, from a high impedance to a low impedance. (That is, to within an equally good approximation, the input impedance $Z_{in}$ of a common collector transistor is infinite and its output impedance $Z_{out}$ is zero.)

Figure 5:
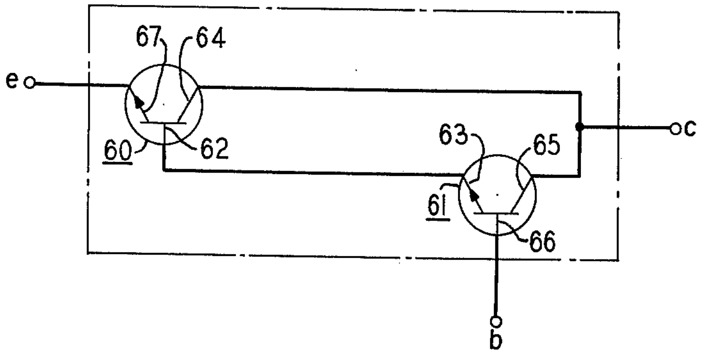

It should be recognized, however, that, as a practical matter, the terminal impedances of a transistor are greater than zero and less than infinity, and the gain of a transistor connected in either of the above-described configurations is less than unity. To approach, more nearly, these idealized conditions, a Darlington pair, as illustrated in FIG. 5, can be used. In this arrangement the base 62 of a first transistor 60 is connected to the emitter 63 of a second transistor 61. The two collectors 64 and 65 are connected together to form the collector $c$ for the pair. The pair emitter $e$ is the emitter 67 of transistor 60, while the pair base $b$ is the base 66 of transistor 61. The gain factor $\alpha$ for the pair is then given as $$\alpha = \alpha_1 + (1 - \alpha_1)\,\alpha_2 \qquad (4)$$

where $\alpha_1$ and $\alpha_2$ are the gain factors for transistors 60 and 61, respectively. If, for example, $\alpha_1$ and $\alpha_2$ are both equal to 0.95, the $\alpha$ for the pair is then equal to 0.9975.

Figure 6A:
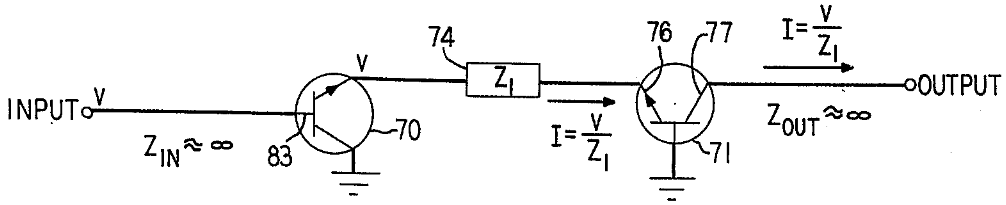
Figure 6B:
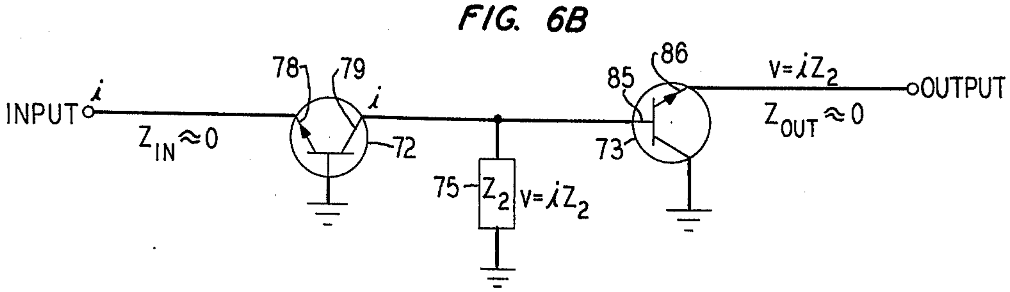

It will be noted that there is an impedance transformation between input and output for each of the transistor configurations illustrated in FIGS. 4A and 4B. However, there is no reason why the same stage cannot have both the lower input and the lower output impedance, and the other stage have the higher input and the higher output impedance. Active stages of this sort are illustrated in FIGS. 6A and 6B. In the former, there is cascaded a common collector transistor 70, a series impedance 74, and a common base transistor 71. In the latter there is cascaded a common base transistor 72, a shunt admittance 75, and a common collector transistor 73.

In operation, a voltage $v$ applied to the base 83 of transistor 70 in FIG. 6A produces a voltage $v$ across impedance 74. This, in turn, causes a current $$i = \frac{v}{Z_1}$$

to flow into the emitter 76 of transistor 71, producing an output current $i$ in collector 77.

In the embodiment of FIG. 6B, a current $i$ applied to the emitter 78 of transistor 72 causes a current $i$ to flow from collector 79 through admittance 75, producing a voltage $v = iZ_2$ to appear at the base 85 of transistor 73, and a substantially equal output voltage at the emitter 86 of transistor 73.

It will be noted that in each of the circuits in FIGS. 6A and 6B, the input impedance $Z_{in}$ and the output impedance $Z_{out}$ are of the same order of magnitude, both being either high impedances or low impedances. This is in contrast to the terminal impedances obtained using only one active element, as is the case in FIGS. 4A and 4B, wherein the element with the lower input impedance has the higher output impedance, and vice versa.

As was indicated hereinabove, the terminal impedances (i.e., input and output) of the active stages differ from that of the external circuits connected thereto by preferably an order of magnitude or more. Thus, for the embodiment of FIG. 1A, the terminal impedance, $Z_h$, for the higher impedance stage, and the terminal impedance $Z_l$ for the lower impedance stage are related to the source and load impedance $Z_o$ by $$Z_h >> \frac{Z_o T^2}{2} \qquad (5)$$

and $$Z_l << 2Z_o \qquad (6)$$

For the embodiment of FIG. 2, the impedance relationships are $$Z_h >> \frac{1}{\frac{1}{Z_o M^2} + \left(\frac{n}{N}\right)^2 \frac{1}{Z_d}} \qquad (7)$$

$$Z_l << Z_d + \left(\frac{nM}{N}\right)^2 Z_o \qquad (8)$$

where $M$ is the transformer turns ratio;

$N$ is the number of turns on the transformer winding connecting the two stages;

$Z_d$ is the matching impedance;

and $n$ is the number of turns between the tap and the lower terminal impedance stage.

For the embodiment of FIG. 3, the preferred impedance relationships are $$Z_h >> Z_o \left(\frac{n_3 + n_2}{n_1}\right) \qquad (9)$$

$$Z_l << Z_o / \left(n_1 + \frac{n_1}{n_2}\right) \qquad (10)$$

All of these expressions apply equally to both the input and the output portions of the respective amplifiers. While, in most cases, the input and output circuits will be the same for each amplifier, they need not be so. If they are not the same, different values will be used for the respective parameters in evaluating the expressions for the input end of the amplifier and for the output end of the amplifier.

Since the manner of connecting the active stages and the various impedances to the input and output transformers depends upon the relative input and output impedances of the active stages, the circuits generally will vary somewhat, depending upon the specifics of the active stages. For example, in the embodiment of FIG. 1A, the impedance of matching impedance 16 depends upon the number of turns $n$ between transformer port 1', to which the load 18 is connected, and the lower output impedance stage. Thus, for a given tap position, this impedance will depend upon which of the active stages, 13 or 14, has the lower output impedance.

Similarly, in FIG. 3, the stages with the higher terminal impedances are connected to transformer ports 3 and 3'. As illustrated, it was assumed that stage 13 had the higher input impedance while stage 14 had the higher output impedance. If, on the other hand, active stages of the type illustrated in FIGS. 6A and 6B are used, the same stage would have both the higher input and the higher output impedances. Assuming this to be the case for stage 13, the circuit would be changed such that at the output end of the amplifier, stage 13 would be connected to transformer port 3', and stage 14 would be connected to port 4'. Also, as indicated above, the relative positions of the matching impedance and the source can be reversed. Thus, numerous and varied other amplifier configurations can readily be arrived at in accordance with these principles by those skilled in the art without departing from the spirit and scope of the invention.

I claim:

1. An amplifier for coupling a signal source to a load comprising:

an input autotransformer and an output autotransformer;

a first tap along said input autotransformer for dividing said input transformer into two unequal portions;

said first tap constituting the input port of said amplifier;

a second tap along said output autotransformer for dividing said output transformer into two unequal portions;

said second tap constituting the output port of said amplifier;

a pair of active stages, each of which is connected between a different end of said input transformer and a different end of said output transformer;

one of said stages having an input impedance that is at least an order of magnitude greater than the net source impedance connected thereto, and the other of said stages having an input impedance that is at least an order of magnitude less than the net source impedance connected thereto;

one of said stages having an output impedance that is at least an order of magnitude greater than the net load impedance connected thereto, and the other of said stages having an output impedance that is at least an order of magnitude less than the net load impedance connected thereto;

an input and output matching impedances connected across at least a portion of said input and output autotransformers, respectively.

2. The amplifier according to claim 1 wherein the input and output impedances of said active stages are related to said source and to said load impedance $Z_o$ by $$Z_h >> \frac{Z_o T^2}{2},$$

and $$Z_l << 2Z_o,$$

where $Z_h$ is the impedance of the higher input or the higher output impedance stage;

$Z_l$ is the impedance of the lower input or the lower output impedance stage;

and $T$ is the ratio of the total number of turns on the input and output transformers to the number of turns between the tap and the lower impedance stage.

3. An amplifier for coupling a signal source to a load comprising:

a $1{:}M$ turns ratio input transformer and a $1{:}M$ turns ratio output transformer;

means for coupling said signal source across one winding of said input transformer;

means for coupling said load across one winding of said output transformer;

a pair of active stages, each of which is connected between a different end of the other winding of said input transformer and a different end of the other winding of said output transformer;

one of said stages having an input impedance that is at least an order of magnitude greater than the net source impedance connected thereto, and the other of said stages having an input impedance that is at least an order of magnitude less than the net source impedance connected thereto;

one of said stages having an output impedance that is at least an order of magnitude greater than the net load impedance connected thereto, and the other of said stages having an output impedance that is at least an order of magnitude less than the net load impedance connected thereto;

and an input and an output matching impedance connected, respectively, to a tap along the other winding of each of said input and output transformers.

4. The amplifier according to claim 3 wherein the input and output impedances of said active stages are related to the source and to the load impedances $Z_o$ by $$Z_h >> \frac{1}{\frac{1}{Z_o M^2} + \left(\frac{n}{N}\right)^2 \frac{1}{Z_d}}$$

and $$Z_l << Z_d + \left(\frac{nM}{N}\right)^2 Z_o$$

where $Z_h$ is the impedance of the higher input or the higher output impedance stage;

$Z_l$ is the impedance of the lower input or the lower output impedance stage;

$M$ is the transformer turns ratio;

$N$ is the number of turns on the transformer winding connecting the two stages;

$Z_d$ is the matching impedance;

and $n$ is the number of turns between the tap and the lower terminal impedance stage.

5. An amplifier for coupling a signal source to a load comprising:

an input autotransformer;

an output autotransformer;

and a pair of active stages;

one of said stages having an input impedance that is at least an order of magnitude greater than the net source impedance connected thereto, and the other of said stages having an input impedance that is at least an order of magnitude less than the net source impedance connected thereto;

one of said stages having an output impedance that is at least an order of magnitude greater than the net load impedance connected thereto, and the other of said stages having an output impedance that is at least an order of magnitude less than the net load impedance connected thereto;

the higher input impedance stage being connected to one end of said input transformer;

the lower input impedance stage being connected to a tap along said input transformer;

the higher output impedance stage being connected to one end of said output transformer;

the lower output impedance stage being connected to a tap along said output transformer;

the other ends of said transformers constituting the input terminal and the output terminal of said amplifier;

and input and output matching impedances connected to a second tap along said respective transformers.

6. The amplifier according to claim 5 wherein said matching impedances are connected to a point along said transformers between said active stages.

7. The amplifier according to claim 6 wherein said taps divide said transformers into three portions of $n_1$, $n_2$ and $n_3$ turns, respectively, and where $$n_2/n_1 = n_3/n_2.$$

* * * * *